Figure 1:
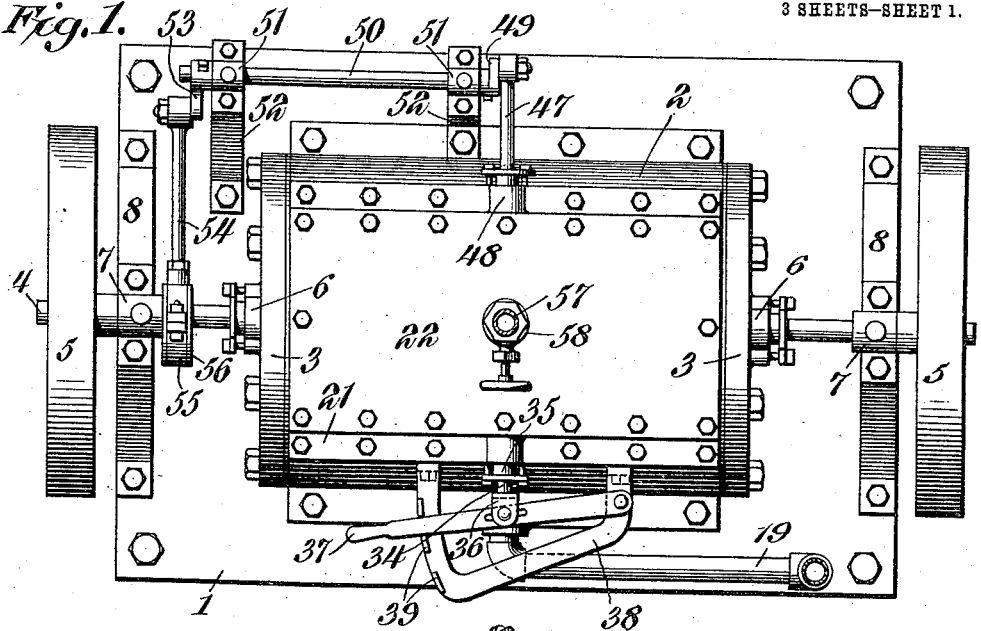

S. C. BAUGHN & G. A. WRIGHT.
ROTARY ENGINE.
APPLICATION FILED MAY 16, 1912.

1,059,702.

Patented Apr. 22, 1913.

3 SHEETS—SHEET 1.

WITNESSES
Howard P. Orr.
H. T. Chapman.

Samuel C. Baughn
and George A. Wright, INVENTORS,

BY E. G. Siggers
ATTORNEY

S. C. BAUGHN & G. A. WRIGHT.
ROTARY ENGINE.
APPLICATION FILED MAY 16, 1912.
1,059,702.
Patented Apr. 22, 1913.
3 SHEETS—SHEET 2.
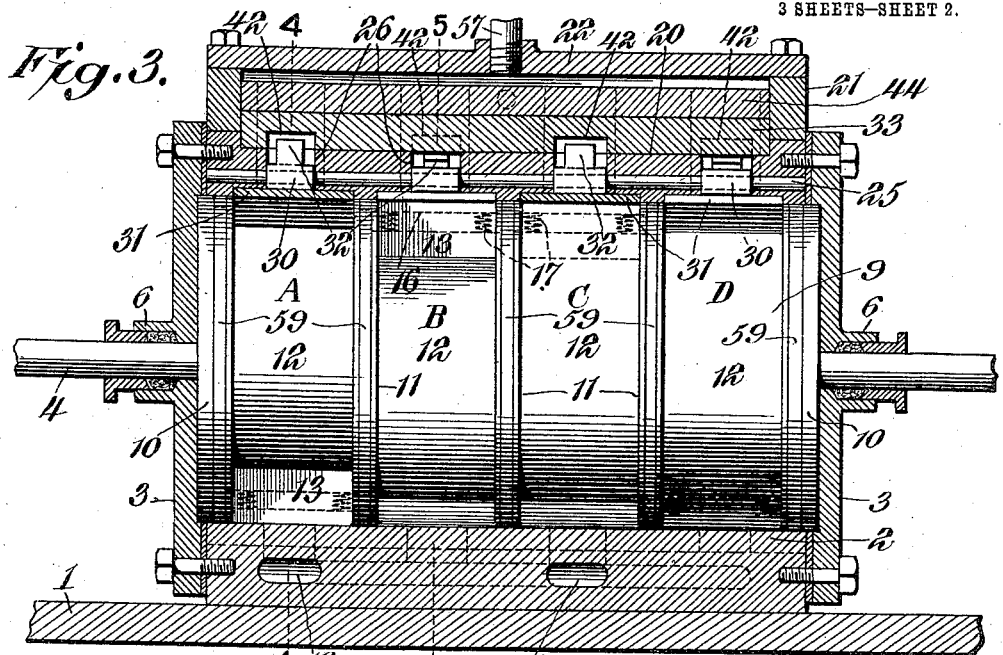
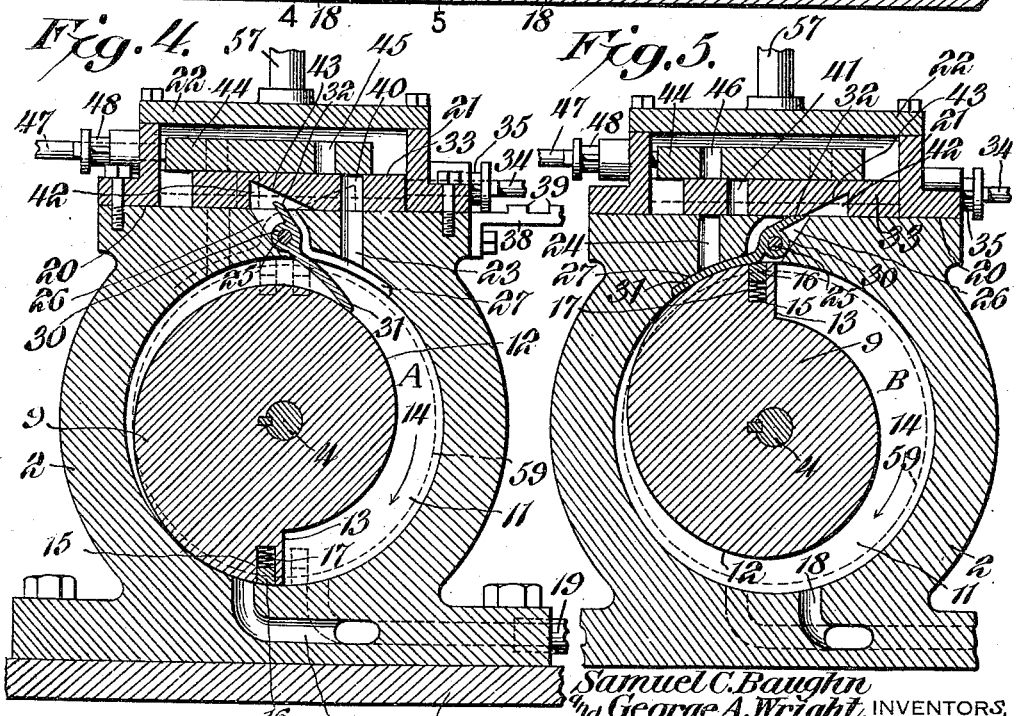
WITNESSES
Howard D. Orr.
F. T. Chapman.
Samuel C. Baughn
and George A. Wright, INVENTORS,
BY
C. G. Siggers.
ATTORNEY

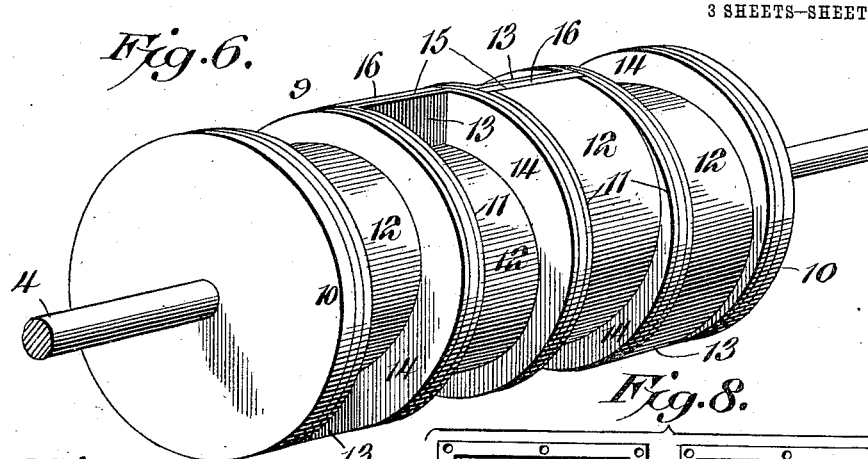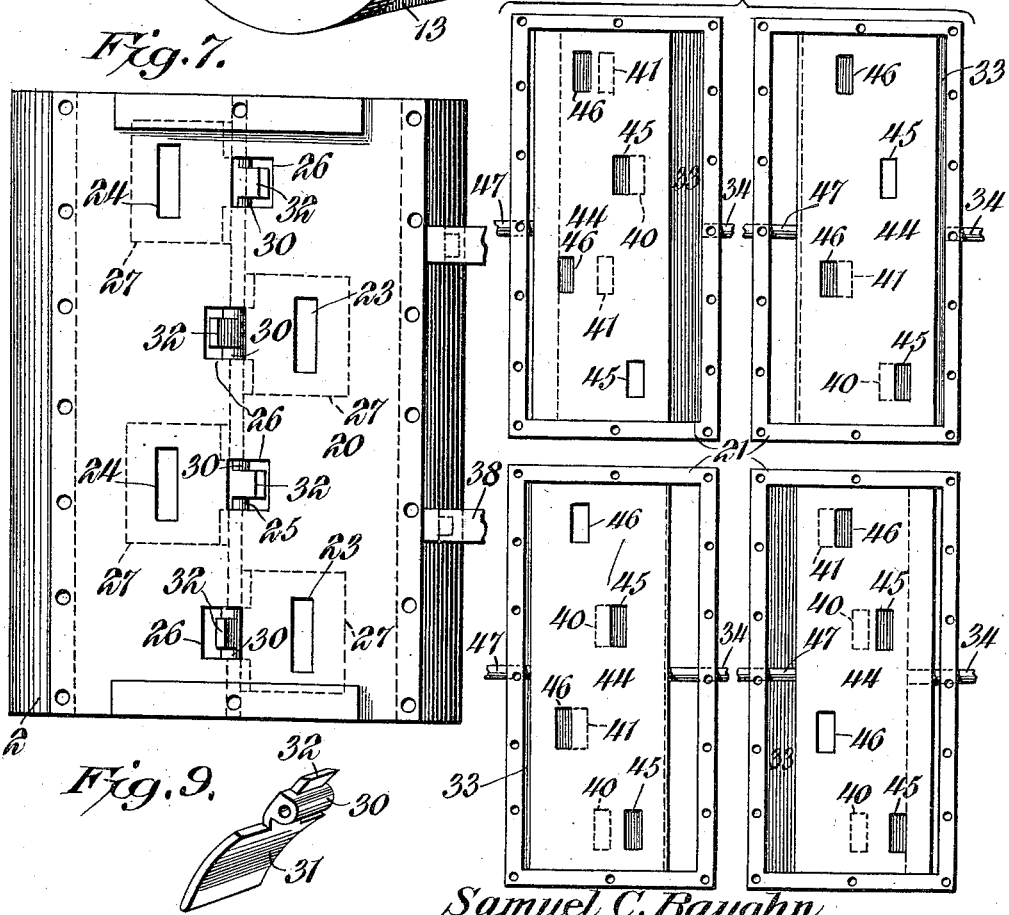

UNITED STATES PATENT OFFICE.

SAMUEL C. BAUGHN AND GEORGE A. WRIGHT, OF CANALOU, MISSOURI, ASSIGNORS OF ONE-SIXTH TO WILLIAM P. SCOTT AND ONE-SIXTH TO BENJAMIN F. EARLES, OF MORLEY, MISSOURI.

ROTARY ENGINE.

1,059,702.      Specification of Letters Patent.      Patented Apr. 22, 1913.

Application filed May 16, 1912. Serial No. 697,766.

*To all whom it may concern:*

Be it known that we, SAMUEL C. BAUGHN and GEORGE A. WRIGHT, citizens of the United States, residing at Canalou, in the county of New Madrid and State of Missouri, have invented a new and useful Rotary Engine, of which the following is a specification.

This invention has reference to improvements in rotary engines, and its object is to provide an engine which may be efficiently driven and which may be readily reversed.

In accordance with the present invention the engine comprises a suitable casing in which is mounted a rotor having pairs of oppositely directed abutments, and the abutments of each pair being diametrically disposed with reference one to the other. The engine is also provided with valves in coactive relation to the respective elements of the rotor in such manner as to divide the steam course for each member of the rotor into two parts, so that live steam may not find its way to the exhaust. Moreover, the engine is provided with reversing and slide valves in coactive relation, so that steam may be admitted to the casing in operative relation to a coactive pair of rotor elements for continuous effort upon the rotor during the full rotation thereof and whenever desired the direction of the rotor may be reversed by a proper manipulation of the reversing valve, the driving of the engine in the reverse direction being brought about by a different pair of rotor elements than in the other or forward direction.

The invention will be best understood from a consideration of the following detailed description, taken in connection with the accompanying drawings forming a part of this specification, with the further understanding that while a practical form of the invention is disclosed in the drawings other practical embodiments of the invention may be made without material departure from the salient features of the invention, wherefore the invention includes such changes and modifications as may be necessary to produce such other embodiments.

Figure 2:
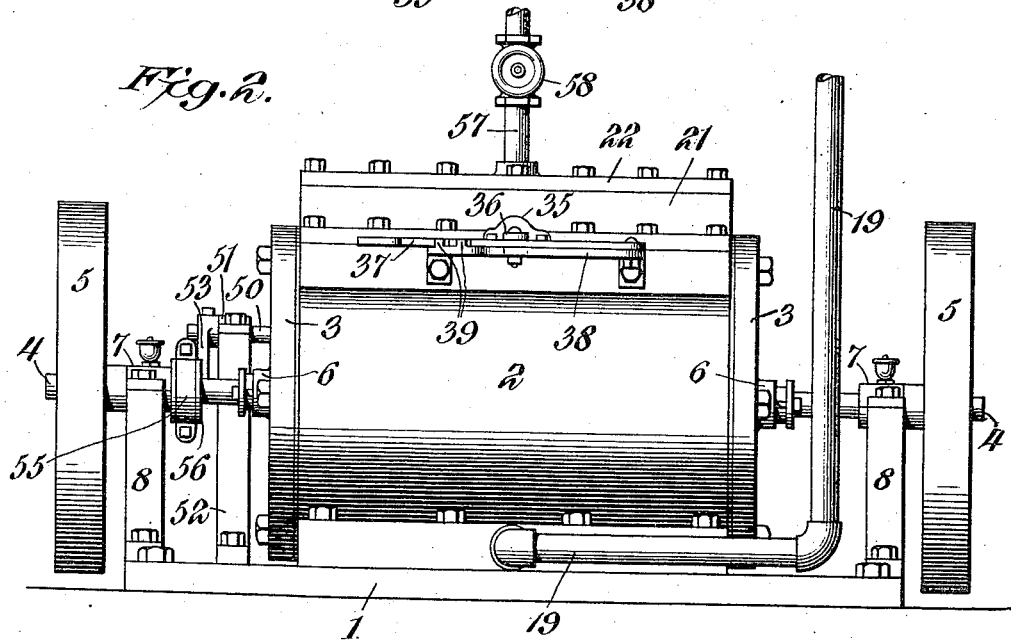

In the drawings—Figure 1 is a plan view of the engine. Fig. 2 is a side elevation thereof. Fig. 3 is a longitudinal central vertical section with some parts shown in elevation. Fig. 4 is a section on the line 4—4 of Fig. 3. Fig. 5 is a section on the line 5—5 of Fig. 3. Fig. 6 is a perspective view of the rotor of the engine. Fig. 7 is a fragmentary plan view of the engine with the valve casing and valve removed. Fig. 8 is a plan view of the main valve casing with the slide valve and reversing valve in different operative position. Fig. 9 is a perspective view of one of the wing valves used in conjunction with the rotor elements.

Referring to the drawings there is shown a base plate 1 upon which is mounted a cylinder 2 provided at the ends with heads 3, and through the cylinder and heads there extends a main shaft 4 having fly wheels 5 at opposite ends. The shaft passes through stuffing boxes 6 in the heads 3, and through journal bearings 7 mounted on pedestals 8 secured at appropriate points to the bed plate 1.

Mounted on the shaft 4 within the casing or cylinder 2 is a rotor 9. The rotor has circular shoulders 10 at the ends and intermediate circular shoulders 11, the intermediate shoulders being spaced one from the other and from the end shoulders 10. The surface of the rotor 9 between the shoulders is formed into a spiral 12 ending in a radial abutment 13, the surface 12 being related to the bore of the cylinder 2 to form a steam rotor is divided by the circular shoulders 13 and gradually decreasing in radial depth toward the other end, finally stopping at a channel 15 extending from one circular shoulder to the other of the rotor and containing a packing strip 16 urged outwardly by springs 17 against the inner surface of the cylinder 2. In the structure shown the rotor is divided by the circular shoulders 10 and 11 into four members A, B, C and D, each having a spirally arranged surface 12. The shoulders or abutments 13 of the members A and C of the rotor are diametrically opposite but face in the same direction with respect to the direction of rotation. The same is true of the shoulders 13 of the members B and D of the rotor, but the shoulders of the members B and D face in the opposite direction to those of the members A and C with respect to the direction of rotation. The members A and C therefore constitute one pair of members which as will hereinafter appear become active to drive the rotor in one direction, while the members B and D constitute the other pair of elements or members and serve to drive the rotor in the opposite direction, only one pair of members being active at a time.

Each chamber 14 has communicating therewith an exhaust passage 18 communicating with a common exhaust pipe 19 leading to some suitable point of disposal, and these exhaust passages communicate with the lower portion of the interior of the cylinder 2 in proper relation to the elements of the rotor.

The top portion of the cylinder 2 is laterally extended and provided with a plane face 20, shown in plan view in Fig. 7, this face being suitably shaped to receive a slide valve casing 21 provided with a cover 22, the parts being suitably secured in place by screws or otherwise. Extending through that portion of the cylinder 2 terminating in the surface 20 are ports 23, 24, the ports 23 opening into the chambers 14 of the members A and C of the rotor and the ports 24 opening into the chambers 14 of the members B and D of the rotor. These ports are located on opposite sides of the longitudinal center line of the surface 20. Extending through the cylinder or casing 2 between the surface 20 and the interior of the casing is a rod 25, and the casing is provided at intervals along the line of the rod with passages 26 merging into recesses 27 on the inner face of the cylinder 2 coincident with the respective steam chambers 14, but extending from the passages 26 in respectively opposite directions. The ports 23 and 24 each open into a respective recess 27, and by said recess communicate with the respective chamber 14. Mounted on the rod 25 within each passage 26 is a hub member 30 having extended from one side a wing valve 31, and from the other side a finger 32. The wing valve 31 is adapted to a respective recess 27 and the finger 32 is of a length to extend through the passage 26 beyond the surface 20 for a purpose which will presently appear.

Within the valve casing 21 and resting on the plane surface 20 is a plate 33 of substantially the length of the valve casing, which latter is of substantially the length of the interior of the valve casing, which latter has an outside length substantially the same as the cylinder 2. The plate 33 constitutes the reversing valve for the engine, and is controlled by a valve rod 34 extending through a stuffing box 35 at an appropriate point on the casing 21, and this rod 34 terminates in a yoke 36 straddling a lever 37 pivoted at one end to a supporting frame 38 in turn fast to the exterior of the valve casing, while the other end of the frame 38 is provided with spaced ears 39 between which the lever 36 may lodge to hold the reversing valve 33 in adjusted positions. The width of the plate or valve 33 is such that it may be adjusted toward one side or the other of the valve casing, and this plate or valve 33 has ports 40, 41 therethrough in position to match the ports 23 or 24 in accordance with the adjustment of the plate or reversing valve 33. Furthermore, the plate or valve 33 is formed in the face riding on the surface 20 with recesses 42 each with an inclined portion 43. These recesses are located to engage the fingers 32 of the wing valves 31, and as there are four such valves in the structure shown there are four recesses 42, but two of these recesses have their inclined surfaces 43 sloping in one direction and the others of the recesses have the like faces sloping in the other direction, while the wing valves 31 are similarly disposed. The arrangement is such that when the valve or plate 33 is moved toward one side of the valve casing all of the wing valves, say those in operative relation to the ports 24, are moved into the corresponding recesses 29 by the engagement of the lower surface of the plate 33 with the fingers 32. However, in this position of the valve the other recesses 42 are so related to the fingers 32 of the other wing valves 31 that the free edges of the wing valves may drop into engagement with the surfaces 12 of the respective members of the rotor, the fingers 32 then passing into the recesses 42 in coincidence therewith. Under these circumstances two of the ports, say the ports 24, are closed, while the other two ports, say the ports 23, are open, so far as the wing valves 31 are concerned.

Mounted to rest and slide on the upper surface of the plate or valve 33 is a slide valve 44 in the form of a plate as long as the interior of the valve casing 21 and of sufficiently less width to admit of the slide valve moving laterally to the valve casing.

The slide valve 42 is provided with ports 45, 46, respectively, and this valve is controlled by a valve rod 47 extending through a stuffing box 48 at one side of the valve casing 21, and is connected to a crank 49 on one end of a rock shaft 50 mounted in bearings 51 supported by pedestals 52 erected on the base plate 1, and the other end of the shaft 51 carries a crank 53 to which is connected one end of a rod 54, the other end of which is provided with an eccentric strap 55 surrounding an eccentric 56 mounted on the shaft 4. By this means the slide valve 44 is reciprocated by the rotative movements of the main shaft 4.

Steam is admitted to the valve casing or chest 21 by means of a pipe 57 in which is located a controlling valve 58.

Let it be assumed that the reversing valve 33 is in the position shown in Figs. 4 and 5, then the finger 32 of the wing valve 31 engaging the member A of the rotor is free to move into the recess 42 then coincident with it and the wing valve therein drops on to the surface 12 of the section A. At the same time a similar condition is set up with respect to section C of the rotor, and the ports 40, there being two such ports, are coincident with the ports 23 in the casing or cylinder 2. Under these conditions and in the absence of the slide valve 44 steam will find ready access to the chamber 14 of the rotor member A between the wing or flap valve 31 and the abutment 13. In this position of the parts the part 13 of the section C is approaching the wing or flap valve 31 of said section, and the spirally enlarging surface 12 has moved such valve into nearly the closed position. In the absence of the slide valve 44 there would be a considerable waste of steam for the chamber 14 is open to the exhaust passage 18 through nearly one-half of a revolution. However, the parts are so timed in operation that when the shoulder 13 of a rotor section is about to pass beyond the exhaust port and thereby open the same to the chamber 14, the slide valve 44 is moved to bring the respective port 45 out of coincidence with the port 40 of the reversing valve 33 and so the supply of steam is cut off from the chamber 14 just prior to the opening of the exhaust port 18, or by a suitable adjustment of the parts the cut-off may be at an earlier period and the expansive force of the steam may be utilized. By the time the slide valve has closed the port 40 leading to the chamber 14 of the member A, the corresponding port leading to the chamber 14 of the member C is open, and as the abutment 13 passes the end of the flap valve 31, the latter drops thereby putting the steam chest into communication with the chamber 14 of the member C and steam enters the chamber 14 between the flap or wing valve 31 of the chamber C and the shoulder or abutment 13 thereof, thus imparting a rotating impulse to the rotor. During this time steam is exhausting from the chamber 14 of the member A, but no steam can enter at this time because the ports 23 and 40 are out of communication with the interior of the steam chest due to the new position of the slide valve 44.

It is immaterial whether or not the ports 46 of the slide valve are in coincidence with the ports 41 of the reversing valve 33, since the wing or flap valves 31 are held positively in the closed position by the engagement of the plane surface of the reversing valve with the fingers 32 of those flap or wing valves entering the chambers of the members B and D. If it be desired to reverse the engine it is simply necessary to move the reversing valve 33 across the interior of the valve chamber or steam chest 21 to positively close the flap valves of the members A and C and release the flap valves of the members B and D of the rotor when the slide valve 44, though operating as before, uncovers the ports leading to the chambers 14 of the sections B and D in proper sequence to cause a continual impulse to be imparted to the rotor in the reverse direction to that first considered.

It will be understood that packing is employed wherever it may be necessary to render the parts steam tight against the pressure employed, and beside the packing strips 16 on the rotor 9 each circular shoulder 10 and 11 is provided with a packing ring 59, so that steam may not escape from one chamber 14 to the other. Usually the reversing valve 33 and slide valve 44 require no packing since the engaging surfaces may be suitably machined to render them practically steam tight.

It will be observed that in the operation of the engine the active members of the rotor are impelled by the steam in succession and the impelling action continues for approximately a half revolution, wherefore the rotor receives a continuous impulse without material break during its entire revolution, although this impulse is divided into two successive impulses applied to different parts of the rotor. The power obtained is, therefore, steady irrespective of the direction of travel of the rotor.

What is claimed is:—

1. A rotary engine provided with a rotor having pairs of members of which one pair is active and the other inactive, a valve individual to each member of each pair and controlling the admission of motive fluid to the respective member, means for holding the valves in closed position for the inactive members and permitting the open position of the valves for the active members of the rotor, and a slide valve movable in timed relation to the rotation of the rotor to admit steam in succession to the active members of the rotor.

2. A rotary engine comprising a suitable casing, a rotor lodged therein and provided with an axial series of members with spiral faces defining separate steam chambers, flap or wing valves movable into engaging relation to the spiral faces, the interior of the casing having recesses for the reception of the wing valves, a reversing member movable into and out of engaging relation with the flap valves and when in engagement with said flap valves holding them in the respective recesses, the reversing member and the casing being provided with steam ports with those of the casing entering the valve receiving recesses, and a slide valve movable operatively with respect to the reversing member to admit steam to those portions of the rotor having the flap valves released by the reversing member, said engine being also provided with a steam chest or casing in inclosing relation to the slide valve and reversing member.

3. A rotary engine comprising a suitable casing, a rotor therein having oppositely directed members for the actuation of the rotor in opposite directions, valves movable into and out of operative relation to the rotor, the casing being provided with steam ports and receptacles for the valves in co-operative relation to the steam ports, and the valves being provided with members extending through the valve casing, a slidable member having ports therein movable into matching relation to the steam ports in the casing, and also having recesses with inclined walls movable into and out of operative relation to the extensions of the said valves for holding them in the recesses in the casing or releasing them therefrom in accordance with the position of the slidable member, and a slide valve carried by the slidable member and provided with ports movable into and out of operative relation to the ports of the slidable member, the casing being provided with a steam chest in inclosing relation to the slidable member and slide valve.

4. A rotary engine having a rotor divided into pairs of members by division walls, said members each having a spiral surface ending in a radial shoulder or abutment with the shoulder or abutment of the member of one pair diametrically opposite that of the other member of the same pair, and the shoulders of one pair being positioned oppositely from the corresponding ones of the other pair, a flap or wing valve for each member of the rotor, those of the related members extending in the same direction and the engine being provided with steam ports in position to be controlled by the said valves, a reversing slide having steam ports movable into matching relation to those of the first named steam ports and positioned to simultaneously engage the valves of one pair of rotor members to close the steam ports leading thereto, and a slide valve movable to control the steam ports through those of the reversing slide, said slide valve being carried by the reversing slide and the engine being provided with a steam chest inclosing the slide valve and reversing slide.

5. A rotary engine provided with a suitable casing, a rotor therein, a steam chest, a slide valve, a reversing slide mounted in the steam chest between the casing and the slide valve, the casing and reversing member being provided with ports movable into matching relation and the casing having recesses on its inner surface in line with the ports of said casing, and the reversing slide being also provided with recesses having walls merging into that face of the slide toward the casing, and pivotally mounted flap valves carried by the casing, each valve having a member adapted to a corresponding recess in the interior of the casing, and a finger extended toward the reversing slide, said finger being shaped to enter a recess in the reversing slide when coincident therewith and to be engaged by the merging wall of the recess to close the valve into the corresponding recess in the casing.

6. A rotary engine comprising a casing having a cylindrical interior, a rotor mounted therein and provided with separated spirally faced members arranged in two pairs with the members of the two pairs alternating and disposed in opposite directions, the spiral faces of the mating members of a pair being positioned diametrically opposite one from the other with respect to the axis of rotation, the casing being provided with ports leading to the several members of the rotor and with passages each merging into a recess coincident with a respective port, said recesses being on the inner wall of the casing, a series of flap or wing valves pivotally mounted in the passages in the casing in line one with the other and related to the members of the rotor to engage the spiral faces thereof, the flap valves being also arranged in two interspersed pairs extending in opposite directions and adapted to the respective recesses and each flap valve having a finger extending through the respective passage in the casing, a steam chest covering that portion of the casing to which the passages and ports extend, a reversing slide mounted in the steam chest in engaging relation to the engine casing and provided with ports movable into matching relation to the steam ports of the casing, said slide being also provided with recesses movable into matching relation to the passages in which the flap valves are mounted, said recesses being disposed to match but one related pair of passages at a time, and the ports being disposed to match but one related pair of steam ports in the casing at a time, and a slide valve mounted in the steam chest and having ports movable into and out of active relation to the ports in the reversing slide when the said ports in the slide are in matching relation to the respective steam ports in the engine casing.

In testimony, that we claim the foregoing as our own, we have hereto affixed our signatures in the presence of two witnesses.

SAMUEL C. BAUGHN.
GEORGE A. WRIGHT.

Witnesses:
C. D. M. GUPTON,
W. P. SCOTT.

Copies of this patent may be obtained for five cents each, by addressing the "Commissioner of Patents, Washington, D. C."